June 7, 1955     A. H. HABERSTUMP     2,710,161
REAR VIEW MIRROR FOR A MOTOR VEHICLE
Filed Dec. 4, 1951
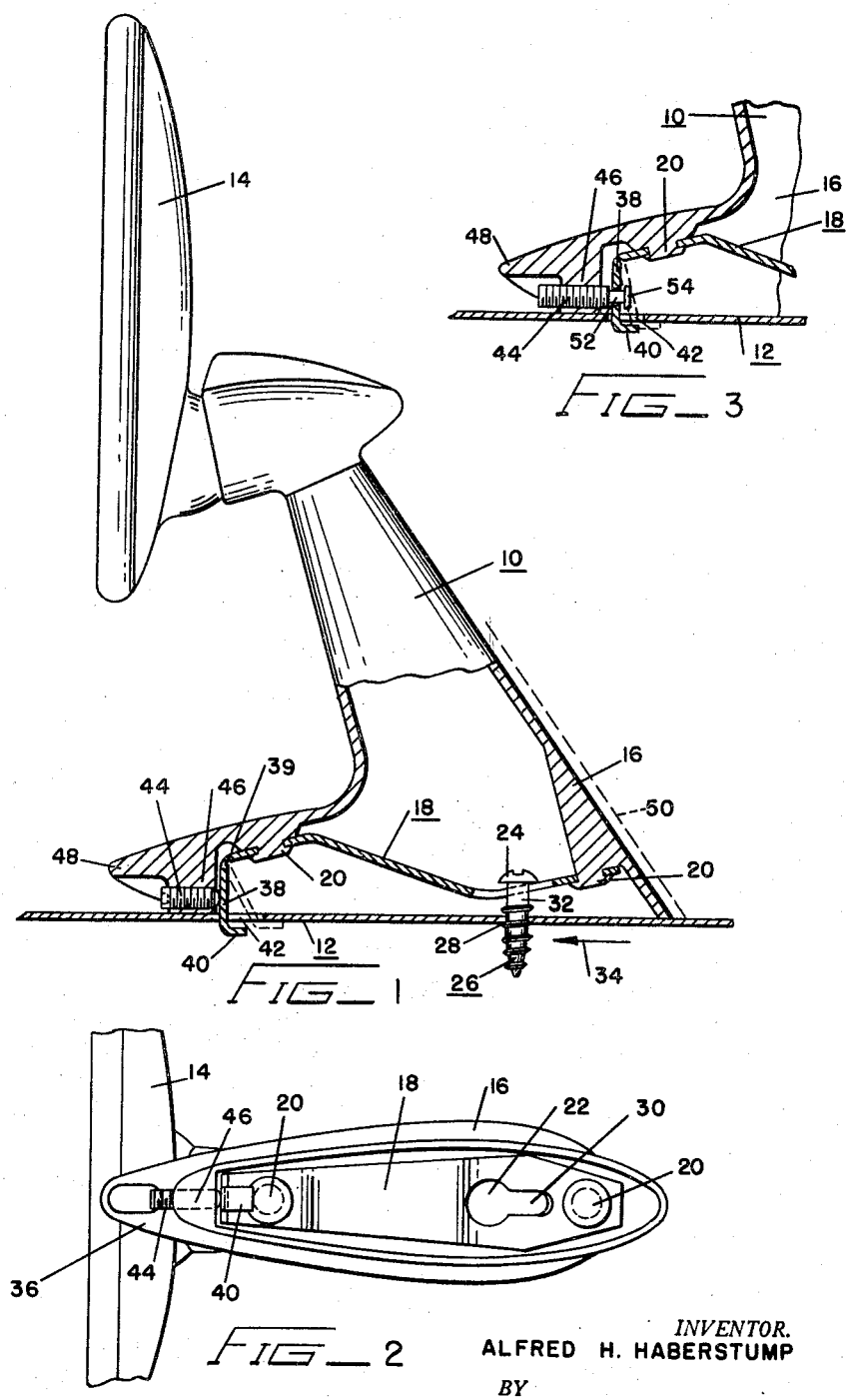
INVENTOR.
ALFRED H. HABERSTUMP
BY
ATTORNEY.

United States Patent Office 2,710,161
Patented June 7, 1955

2,710,161

REAR VIEW MIRROR FOR A MOTOR VEHICLE

Alfred H. Haberstump, Detroit, Mich., assignor to George C. Knight Company, Detroit, Mich., a corporation of Michigan Application December 4, 1951, Serial No. 259,813

3 Claims. (Cl. 248—203)

This invention relates to rear view mirrors for motor vehicles, and more particularly to improved attaching means for securing rear view mirrors to the side of motor vehicles.

Rear view mirrors positioned outside of the passenger compartment of a motor vehicle to enable the driver to observe road and traffic conditions behind the vehicle are being used in increasing numbers as a safety precaution.

It is desirable that rear view mirrors be secured to the side of vehicles in such a manner that relatively little time is required to make the installation, and that the installation should be neat so as to not mar the visible finish of the car when the mirror is installed.

The attachment of the mirror to the vehicle should be such that it is virtually theftproof because the mirror is exposed and is subject to being stolen unless attached in such a manner that access cannot readily be had to the attaching mechanism.

Rear view mirrors are subject to a great deal of vibration and must, therefore, be capable of being tightened periodically to prevent rattling and undesirable looseness which can mar the finish of the vehicle.

An object of this invention is therefore to provide improved fastening means embodying the above stated features for securing rear view mirrors to motor vehicles.

Another object resides in the provision of a simplified method of securing an accessory to a motor vehicle in such a manner that it is only necessary to drill two spaced holes in the vehicle.

A further object of the invention is to provide an improved attaching plate which may be readily secured to an accessory and which has a cam-shaped opening for the reception of the head of a screw threaded into the side of a vehicle to which the accessory is to be attached, the attaching plate having a prong adapted to project through an opening in the vehicle spaced from the screw and be deformed therein to exert a camming tightening force to secure the accessory to the vehicle.

Still another object of the invention resides in the provision of an improved fastening device for securing an accessory to a vehicle in such a manner that it can be tightened whenever necessary.

Yet a further object is to provide a simplified theftproof attaching mechanism for securing an accessory to a motor vehicle.

Further objects and advantages of this invention will be apparent from the following description considered in connection with the appended drawings in which:

Fig. 1 is a side elevational view, partly in section of a rear view mirror embodying the present invention.

Fig. 2 is bottom plan view of the device illustrated in Fig. 1.

Fig. 3 is a fragmentary sectional view of a modified form of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Figs. 1 and 2, it will be noted that the invention is illustrated as applied to a rear view mirror assembly 10 adapted to be secured to a side panel or other portion 12 of a motor vehicle.

The rear view mirror assembly 10 has a mirror carrying shell 14 and a base 16, preferably of elongated construction as more fully disclosed in Fig. 2.

An attaching plate 18 is secured in the base 16 in any desired manner as by rivets 20 preferably formed integrally with the base 16 where the base is formed by a casting operation as by die casting. The rivets 20 are projected through apertures in the plate 18 and are headed over as by a riveting or spinning operation.

The attaching plate 18 is formed with a round aperture 22 proportioned to receive the head 24 of a bulbous projection or screw 26 threaded through an aperture 28 in the panel 12. An elongated slot 30 communicates with the round aperture 22 to receive the shank 32 of the screw 26 beneath the head 24.

The plate 18 is contoured between the rivets 20 in such a manner that a camming action is provided to force the base 16 more tightly into engagement with the panel 12 when the base 16 is moved on the screw 26 in the direction of the arrow 34.

The end of the attaching plate 18 adjacent the tapered end 36 of base 16 is reduced in cross-section and is turned downwardly as illustrated at 38 and terminates in a forwardly extended hook 40 adapted to project through a second aperture 42 spaced from the aperture 28 which receives the screw 26 to engage the hook end 40 of the attaching plate 18 beneath the panel 12 in the aperture 42 to securely clamp the base 16 to the panel 12. One illustrative example of such deflecting means comprises a screw 44, preferably of the "Allen" type threaded into an enlarged section 46 beneath the converging side walls of the tapered end 36 of the base 16 forwardly of the overhanging end 48.

The end of the screw 44 engages the downturned section 38 of the attaching plate 18 and deflects it forwardly toward the dotted line position shown in Fig. 1 at which time it wedges in the panel 12 surrounding the aperture 42.

This shifting of the downturned section 38 exerts a force on the base 16 tending to move it in the direction of the arrow 34 to cause the head 24 of the screw 26 to shift in the elongated slot 30 of the plate 18 to exert a camming force to urge the base 16 more tightly into engagement with the panel 12.

In the installation of the rear view mirror assembly 10 to a motor vehicle, an appropriate portion of the vehicle is selected, such for example as the panel 12. The apertures 28 and 42 are drilled in the panel, a template preferably being employed to space the aperture as desired. The screw 26 is next threaded into the aperture 28 to such a point that a predetermined length 32 of the screw is exposed between the head 24 and the surface of the panel 12.

The rear view mirror assembly 10 is then positioned as illustrated in the dotted line position 50 of Fig. 1 the head 24 of the screw 26 projecting through the aperture 22 in the attaching plate 18. The assembly is then shifted rearwardly to direct the shank 32 of the screw 26 into the slot 30. The downturned portion 38 of the attaching plate is simultaneously projected through the aperture 42 in the panel. The screw 44 is then rotated to tighten it and depart the downturned portion 38 of the attaching plate 18 in the aperture 42, forcing the entire rear view mirror assembly 10 rearwardly relative to the panel 12 to the full line position to shift the cam surface of the plate 18 relative to the head 24 of the screw 26 to more firmly engage the base 16 of the mirror assembly 10 with the panel 12 of the vehicle.

If the assembly loosens up due to vibration or for other reasons, it is only necessary to tighten the screw 44 to again tighten it up thereby preventing rattles and other undesirable characteristics.

It will also be noted that a theft proof attachment is effected because if the screw 44 is loosened, it merely backs away from the downturned section 38 of the attaching plate 18 which effectively retains the rear view mirror assembly locked in place. The mirror assembly may thus be readily tightened several times without destroying the theftproof characteristics of the attaching mechanism.

If it is necessary or desirable that the rear view mirror assembly may be removed from the vehicle after having been attached thereto, the modification illustrated in Fig. 3 may be employed. In this embodiment the screw 44 is provided with a shank 52 of reduced diameter adapted to project through an aperture in the downturned section 38 of the attaching plate 18. An enlarged section 54 of larger diameter than the aperture in the downturned section 38 is carried by the shank 52. To tighten the mirror into firm engagement with the panel 12 the screw 44 is rotated in the tightening direction. The enlarged diameter section between the shank 52 and the screw 44 engages the downturned section 38 and shifts it forwardly in the aperture 42 of the panel 12 as described in connection with the embodiment of Figs. 1 and 2.

To remove the mirror assembly from the vehicle, the screw 44 is rotated in the loosening direction, the enlarged section 54 of the screw 44 beyond the shank 52 engages the downturned section 38 surrounding the aperture therein and shifts it rearwardly from the dotted line clamping position to the full line releasing position. The hooked portion 40 may then be removed from the aperture 42 in the panel 12 and the entire assembly shifted forwardly to release the attaching plate from the screw 26 in the panel 12.

While the invention has been described with particular reference to two embodiments thereof, it will be apparent that various changes may be made without departing from the spirit of the invention as defined by the following claims.

I claim:

1. In a rear view mirror, a supporting base adapted to be secured to a side panel of a motor vehicle having a screw threaded therein and an aperture spaced from the screw, an attaching bracket secured to the supporting base and having a downturned section adapted to project into the aperture in said panel and an aperture to receive the head of the screw and having an elongated slot communicating with the aperture to receive the shank of the screw, the attaching plate being so proportioned that when the head of said screw in the panel is projected through the aperture in the attaching plate and the base is shifted longitudinally thereof to move the shank of the screw in the elongated slot of the attaching plate said base is moved toward the panel, and a screw threaded in the base in a plane perpendicular to said downturned section to engage the downturned section of the attaching plate and deflect it in the aperture in the panel to lock the base to the panel to provide a theft proof attachment for said mirror.

2. A theftproof attachment for securing a rear view mirror to a panel of a motor vehicle having an aperture and a screw carried by the panel and spaced from the aperture therein, a contoured attaching plate secured to the rear view mirror and having a downturned section adjacent one of its ends adapted to project into the aperture in the panel and having an aperture spaced from said downturned section adapted to receive the screw carried by the panel and an elongated slot communicating with the aperture to clampingly engage the screw when the rear view mirror is shifted longitudinally of the screw and aperture in the panel, and a screw associated with the rear view mirror to abut and deflect the downturned section of the attaching plate into clamping engagement with the panel adjacent the aperture therein, the last named screw extending substantially perpendicular to the downturned section of the attaching plate.

3. In a rear view mirror, a supporting base adapted to be secured to a side panel of a motor vehicle and having an aperture adjacent one of its ends, a screw threaded into the base, a cam bracket having an aperture to receive the head of the screw and an elongated slot adapted to receive the shank of the screw and communicating with the aperture, means to attach opposite ends of the bracket to the side of a vehicle, the bracket being so proportioned that when the head of said screw in the base is projected through the aperture in the bracket and the base is shifted longitudinally thereof to move the shank of the screw in the elongated slot of the bracket said base is moved toward the side of the vehicle, the cam bracket having a downturned portion adapted to project through the aperture in the side panel of the vehicle, and motion transmitting means between the base and the downturned portion of the cam bracket and extending perpendicular to the downturned portion whereby said downturned portion of the cam bracket can be shifted toward and away from the aperture in the side panel of the vehicle.

References Cited in the file of this patent

UNITED STATES PATENTS

| | | |
|---|---|---|
| 2,505,588 | Smith | Apr. 25, 1950 |
| 2,533,475 | Koonter | Dec. 12, 1950 |
| 2,558,328 | Winslow | June 26, 1951 |
| 2,571,002 | Anderson | Oct. 9, 1951 |